July 25, 1933. W. H. HODGSON 1,919,368
TIRE PATCH
Filed Nov. 16, 1932
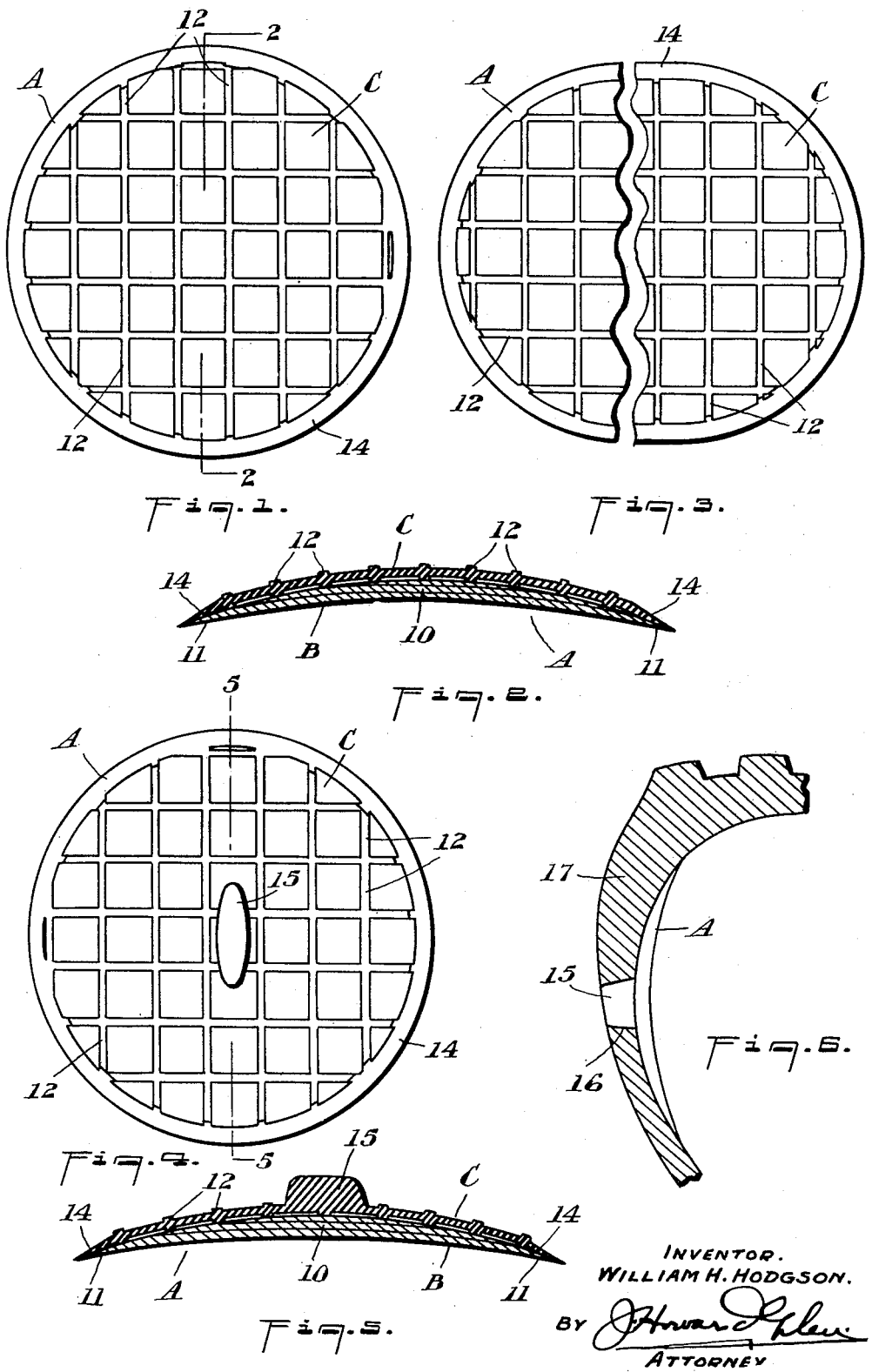
INVENTOR.
WILLIAM H. HODGSON.
BY
ATTORNEY Patented July 25, 1933

1,919,368

UNITED STATES PATENT OFFICE

WILLIAM H. HODGSON, OF MOOSE JAW, SASKATCHEWAN, CANADA

TIRE PATCH

Application filed November 16, 1932. Serial No. 642,918.

This invention relates to tire patches and more particularly to patches adapted to be fitted to the inside of tire shoes or casings, to protect and reinforce worn, weakened or fractured portions thereof.

In the tire industry it is a well known fact that after a tire has been in use for a certain length of time trouble develops and such trouble consists in punctures, stone bruises, nail holes, cracks, etc. etc. and it is through such crevices that foreign matter creeps into the inner wall of a tire shoe or casing resulting invariably in the destruction of both the casing and the tube.

To cope with fractures of this nature, tire patches and boots have been developed for insertion in the tire shoe, as a means to prevent the ingress of foreign matter and at the same time reinforce and protect both the casing and the inner tube.

In such development it has been found from experience that even though tire patches and boots have been mounted within the tire shoe, such patch or boot has a tendency to move or creep, thus in a short time the patch has moved to a position where the fracture is completely open and destructive foreign matter readily works its way into the casing.

To overcome this and other difficulties associated with patches of this nature, I have developed a tire patch for use with tire shoes or casings, having embodied therein strong adhesives and gripping qualities to enable it to strongly adhere to the casing within which it is placed and even under most trying conditions it will retain its original position, thus the weakened or fractured portion is fully and carefully protected and the life of the tire is materially increased.

In structure the material or coating forms an essential feature of the patch and is composed of raw or semi-cured gum rubber. In this form the properties of the raw or semi-cured material, not having been "broken down" in a mill, have an abundant amount of elasticity as well as endurance and resistance, it is therefore for these reasons particularly well adapted for such purposes. In addition to the foregoing the raw gum has remarkable adhesive properties and when placed between the fabric or base of a tire patch and the casing or shoe has unexcelled gripping qualities.

A further advantage of material of this nature is that when employed as a tire patch it gradually works itself into the crevice or fracture in the tire and even after a considerable portion of the gum has been worn by road contact, additional material will continue to work its way into the fracture as the tire continues its service.

Where the fracture of the tire shoe is subnormal, merely placing a patch upon the interior is insufficient since there is a considerable opening through which foreign matter grinds its way. To meet such a condition, I form the patch with an integral projecting portion or plug of convenient form and shape which is adapted to extend into such crevice thereby effectively sealing it.

One of the objects of the present invention therefore is to provide a tire patch of this character which will strongly adhere and is provided with means to prevent creeping when in position.

A further object of the invention is to provide a tire patch of this character which may, without the necessity of vulcanization, be readily fitted to a tire shoe.

A further object of the invention is to provide a tire patch of this character with a ribbed surface wherein the rib means contact with the tire shoe or casing and form anti-creeping means.

A still further object of the invention is to provide a tire patch of this character which may be applied to the tire with or without cement and when applied with cement such would be applied in a normal atmospheric state.

Yet a further and important object is to provide a tire patch of this character composed of a base portion and a raw or semi-cured gum rubber portion.

Yet another object of the invention is to provide a patch of this character wherein the edges thereof are bevelled or skived.

With the foregoing and other objects in view the invention consists essentially of the novel combination and arrangements of materials hereinafter described and illustrated in the accompanying drawing in which:

Figure 1 is a plan or face view of an embodiment of my improved tire patch which for convenience of illustration is shown of annular formation.

Figure 2 is a section taken on the line 2—2 of Figure 1.

Figure 3 is a plan or face view of the tire patch illustrated as of oval formation.

Figure 4 is a plan or face view of the tire patch indicating the integral plug or projection associated therewith.

Figure 5 is a section taken on the line 5—5 of Figure 4, and,

Figure 6 is a fragmentary view of a tire showing the patch illustrated in Figure 4 associated therewith, the plug or projection extending into a fracture or crevice in the casing or tire shoe.

Referring now to the several views of the drawing wherein like letters and numerals of reference indicate corresponding parts in the various views, the letter A designates the tire patch as a whole which comprises a base B and a covering C.

In the views illustrated I have indicated the patches as round and substantially oval in formation. It will be understood, however, that this is a matter of illustration only and that such patches may take various and convenient forms such, for example, as square, rectangular, strip-like, etc., etc., without departing from the spirit of the device.

Reverting again to the patch and its structure, the base thereof may conveniently be made from old or used casings and comprises a plurality of superimposed layers of rubberized fabric 10. As indicated in Figs. 2 and 5 the central portion of the fabric is comparatively thick tapering to a featherlike edge at the outside as indicated a 11.

Overlying the base B is the layer of raw or semi-cured gum rubber C previously referred to. This layer it will be observed by referring to Figs. 1 and 2 is formed with a series of ribs or ridges 12 and such ridges may take any practical form such as right-angled intersecting ribs, diamond shape, radial and annular, etc. etc. In the presently disclosed illustration the ribs or ridges combine to form indentures or depressions which in combination provide a strongly adhering and anti-creeping surface. The mode of connecting the layer C to the base B may be that of slightly heating the former or the application of a cement, or both.

In again referring to Fig. 2, it will be observed that the underside of the raw or semi-cured gum rubber contacting with the base is also provided with a ribbed surface and while it is not essential to rib the under surface, the gripping properties are materially increased by so doing.

In addition to the foregoing the edge or edges of the raw or semi-cured gum rubber are bevelled or skived as indicated at 14 and such bevelling or skiving is important for two reasons; first, during such bevelling operation the globules contained in the raw or semi-cured rubber are laid open with the result that these edges form strong frictional resistance when contacting with the tire shoe or casing, and second, a smooth surface is provided for pneumatic contact.

In the embodiment disclosed in Figs. 4 and 5 I provide the layer of raw or semi-cured gum rubber C with an integral projection or plug 15. The plug, as previously described, is adapted, as particularly illustrated in Fig. 6, to fit into the crevice 16 of a fracture in the wall or other portion of the tire shoe 17.

From what has been described and illustrated, it will be seen that I have developed a new and practical tire patch which is inserted without difficulty in a weak or fractured tire shoe and which when in position resists a tendency to displace or creep, at the same time, due to the properties of the raw or semi-cured gum rubber a portion of which will automatically fill or work into the small crevice, thus effectively sealing the entrance against destructive foreign matter, hence increasing the life of the tire shoe.

Many changes may be made in the above construction and many apparently widely different embodiments of the invention constructed within the scope of the claims without departing from the spirit thereof. It is intended therefore that all matter contained herein shall be interpreted in an illustrative rather than a limitative sense.

What I claim as my invention is:

1. A tire patch for tire shoes and the like comprising a base of flexible material, a layer of raw or semi-cured gum rubber mounted on and connected to the said base, the edges of the said layer being bevelled and a series of intersecting rib members formed on the face of the said layer of gum rubber.

2. A tire patch for tire shoes and the like comprising a base of flexible material, a layer of raw or semi-cured gum rubber mounted on and secured to the said base, a series of intersecting rib members formed integral with the layer of raw or semi-cured gum rubber and a projecting plug member formed integral with the said layer.

3. A tire patch for tire shoes and the like comprising a flexible base member, a coating of raw or semi-cured gum rubber for the base, the edges of the said coating being bevelled, a series of rib members formed on the face of the coating, and an integrally formed plug projecting from the face of the raw or semi-cured gum rubber.

WILLIAM H. HODGSON.